United States Patent
Yamato

(10) Patent No.: US 11,947,975 B2
(45) Date of Patent: Apr. 2, 2024

(54) OFFLOAD SERVER, OFFLOAD CONTROL METHOD, AND OFFLOAD PROGRAM

(71) Applicant: Nippon Telegraph and Telephone Corporation, Tokyo (JP)

(72) Inventor: Yoji Yamato, Musashino (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 105 days.

(21) Appl. No.: 17/800,069

(22) PCT Filed: Feb. 17, 2020

(86) PCT No.: PCT/JP2020/006065
§ 371 (c)(1),
(2) Date: Aug. 16, 2022

(87) PCT Pub. No.: WO2021/166031
PCT Pub. Date: Aug. 26, 2021

(65) Prior Publication Data
US 2023/0096849 A1  Mar. 30, 2023

(51) Int. Cl.
G06F 9/44 (2018.01)
G06F 9/445 (2018.01)

(52) U.S. Cl.
CPC ............... *G06F 9/44521* (2013.01)

(58) Field of Classification Search
None
See application file for complete search history.

(56) References Cited

U.S. PATENT DOCUMENTS

| 10,372,497 | B1* | 8/2019 | Zelenov | G06F 9/54 |
| 2016/0117498 | A1* | 4/2016 | Saxena | G06F 21/445 726/26 |
| 2020/0371828 | A1* | 11/2020 | Chiou | G06F 9/5055 |

OTHER PUBLICATIONS

Al-Saber et al., "SemCache++: Semantics-Aware Caching for Efficient Multi-GPU Offloading", ACM, 2015 (Year: 2015).*
[No Author Listed] [online], "OpenCL 2D Fast Fourier Transform Design Example," intel.com, available on or before Aug. 11, 2020, retrieved on Jul. 8, 2022, retrieved from URL <https://www.intel.com/content/www/us/en/programmable/support/support-resources/design-examples/design-software/opencl/fft-2d.html>, 3 pages.
Press et al., Numerical Recipes in C, Cambridge University Press, Cambridge, New York, 1988, retrieved from URL <https://www.cec.uchile.cl/cinetica/pcordero/MC_libros/NumericalRecipesinC.pdf>, 1018 pages.

(Continued)

Primary Examiner — Insun Kang
(74) Attorney, Agent, or Firm — Fish & Richardson P.C.

(57) ABSTRACT

An offload server includes: an application code analysis section configured to analyze a source code of an application and detect external library calls included in the source code as replacement sources; a replacement function detection section configured to retrieve libraries and IP cores from a code pattern database by using the detected external library calls as keys, as replacement-destination libraries/IP cores; and a replacement processing section configured to replace processing descriptions of the replacement sources with processing descriptions of the replacement-destination libraries/IP cores retrieved by the replacement function detection section and to generate interfaces of a CPU to the replacement-destination libraries/IP cores.

7 Claims, 6 Drawing Sheets

(56) References Cited

OTHER PUBLICATIONS

Yamato et al., "Automatic GPU Offloading Technology for Open IoT Environment," IEEE Internet of Things Journal, Sep. 2018, 10 pages.
Yamato et al., "Evaluation of Automatic FPGA Offloading for Loop Statements of Applications," IEICE technical report, Feb. 2020, 18 pages (with English Translation).
Yamato et al., "Study of parallel processing area extraction and data transfer number reduction for automatic GPU offloading of IoT applications," Journal of Intelligent Information Systems, Aug. 2019, 18 pages.
[No Author Listed] [online], "OpenCL™ 2D Fast Fourier Transform Design Example (Source Code)," intel.com, retrieved on Aug. 15, 2022, retrieved from URL <https://www.intel.com/content/www/us/en/programmable/support/support-resources/design-examples/design-software/opencl/fft-2d.html>, v17.1 x64 Windows package.zip, 183 pages.

* cited by examiner

OFFLOAD SERVER, OFFLOAD CONTROL METHOD, AND OFFLOAD PROGRAM

CROSS-REFERENCE TO RELATED APPLICATIONS

This application is a National Stage Application of PCT Application No. PCT/JP2020/006065, filed on Feb. 17, 2020. The disclosure of the prior application is considered part of the disclosure of this application, and is incorporated by reference in its entirety into this application.

BACKGROUND

Technical Field

The present invention relates to an offload server, an offload control method, and an offload program for automatically offloading functional processing to an accelerator such as an FPGA (Field Programmable Gate Array).

Background Art

Heterogeneous computational resources, other than CPUs (Central Processing Units), are increasingly used. For example, image processing has begun to be performed on servers that use an enhanced GPU (Graphics Processing Unit) (accelerator) and signal processing has begun to be accelerated by an FPGA (accelerator). An FPGA is a programmable gate array that can be configured by a person such as a designer after manufacture and is a type of PLD (Programmable Logic Device). Amazon Web Services (AWS) (registered trademark) provides GPU instances and FPGA instances and these resources can be used on-demand as well. Microsoft (registered trademark) is using FPGAs to increase search efficiency.

In an OpenIoT (Internet of Things) environment, a wide variety of applications are expected to be created using service coordination techniques and the like, and operational applications are expected to be improved in performance by exploiting further advanced hardware. To that end, however, programing and settings adapted to the hardware to be operated are required. For example, a lot of technical knowledge regarding techniques such as CUDA (Compute Unified Device Architecture) and OpenCL (Open Computing Language) is required, making the programing and settings challenging. OpenCL is an open API (Application Programming Interface) that can uniformly handle any computational resources (not limited to CPUs and GPUs) without being bound to specific hardware.

In order to allow GPUs and FPGAs to be readily used in user's IoT applications, the following is required: when deploying a general application such as an image processing or cryptographic processing application to run in an OpenIoT environment, it is desirable that an OpenIoT platform analyze application logics and automatically offloads processing to a GPU/FPGA.

CUDA, which is a development environment for GPGPU (General Purpose GPU) which uses computational capability of a GPU for other processing in addition to image processing, are evolving. CUDA is a development environment for GPGPUs. Further, OpenCL has emerged as a standard for uniformly handling heterogeneous hardware such as GPUs, FPGAs, and many-core CPUs.

In CUDA and OpenCL, programming is performed using extensions of C language. However, the difficulty of such programming is high because it requires describing memory-to-memory copy/release operations between a CPU and devices like GPUs. In fact, not many engineers can make full use of CUDA and OpenCL.

There is known a technique in which, for the purpose of using a GPGPU simply, portions to be processed in parallel, such as loop statements, are designated in a directive-based language and a compiler compiles them into device-specific code in accordance with the directives. There are technical specifications such as Open Accelerator (OpenACC) and compilers such as The Portland Group, Inc. (PGI) compiler (registered trademark). In an example using OpenACC, a user specifies, in a code written in C/C++/Fortran language, an OpenACC directive to cause parallel processing to be performed. The PGI Compiler checks the parallelizability of the code, generates execution binaries for GPU and CPU, and converts them to execution modules. IBM JDK (registered trademark) supports a function of offloading designation of parallel processing in accordance with the lambda format of Java (registered trademark) to a GPU. Using these techniques, programmers need not be aware of, for example, data allocation to GPU memory.

In this way, offload processing to a GPU or an FPGA has been enabled by techniques such as OpenCL, CUDA and OpenACC.

However, while offload processing has been enabled, there are many problems to be addressed for appropriate offloading. For example, there are compilers with automatic parallelization functions. Such compilers includes Intel compiler (registered trademark). For automatic parallelization, parallel processing portions, such as for statements (iteration statements), in a program are extracted. However, when the parallel processing portions are made to operate in parallel using a GPU, it is often unable to achieve good performance due to data exchange overhead between a CPU memory and a GPU memory. To accelerate by using a GPU, a skilled person has to perform tuning in OpenCL or CUDA and to search for appropriate parallel processing portions by using PGI Compiler or the like.

For this reason, it is difficult for an unskilled user to improve the performance of an application by using a GPU. In addition, even when using an automatic parallelization technique, much time is taken for trial-and-error tuning to determine whether to parallelize for statements or not before starting use of the application.

Examples of attempts to automate trial-and-error on parallel processing portions include Non-Patent Literatures 1 and 2. Non-Patent Literatures 1 and 2 attempt to appropriately extract loop statements suitable for offloading to a GPU by repeating performance measurements in a verification environment using an evolutionary computation technique and to collectively perform a transfer of variables between a CPU and a GPU in nested loop statements at an outermost possible loop, to achieve automatic acceleration.

CITATION LIST

Non-Patent Literature

Non-Patent Literature 1: Y. Yamato, T. Demizu, H. Noguchi and M. Kataoka, "Automatic GPU Offloading Technology for Open IoT Environment," IEEE Internet of Things Journal, September 2018.

Non-Patent Literature 2: Y. Yamato, "Study of parallel processing area extraction and data transfer number reduction for automatic GPU offloading of IoT applications," Journal of Intelligent Information Systems, Springer, DOI: 10.1007/s10844-019-00575-8, August 2019.

Non-Patent Literature 3: Y. Yamato, "Evaluation of Automatic FPGA Offloading for Loop Statements of Applications," IEICE technical report, SWI M2019-25, February 2020.

Non-Patent Literature 4: Numerical Recipes in C.

Non-Patent Literature 5: "OpenCL™ 2D Fast Fourier Transform Design Example (Source Code)" from Intel.

SUMMARY OF THE INVENTION

Technical Problem

Non-Patent Literature 1 attempts to automatically extract appropriate parallel processing areas for offloading to a GPU from CPU-based general code and to search for appropriate parallel processing areas using a GA on parallelizable loop statements, thereby to achieve automatic offloading to the GPU. However, in particular when increasing the speed with FPGAs, as it is often the case that the algorithm is modified from a CPU-based algorithm to an algorithm suitable for hardware processing to increase the speed, it is often the case that the performance obtained only by simple offloading of loop statements is insufficient compared to manually changing the algorithm to increase the speed.

The present invention has been made in light of the foregoing, and an object of the present invention is to increase the speed of offload processing in automatic offloading to a PLD (for example, an FPGA).

Means for Solving the Problem

To solve the problem described above, provided is an offload server for offloading specific processing of an application to a Graphics Processing Unit (GPU) or a Programmable Logic Device (PLD), the offload server including: one or more hardware processors; a storage section, implemented using one or more of the one or more hardware processors, configured to store, in a code pattern database, libraries usable for offloading the specific processing to the GPU and IP cores usable for offloading the specific processing to the PLD; an application code analysis section, implemented using one or more of the one or more hardware processors, configured to analyze a source code of the application to detect external library calls included in the source code; a replacement function detection section, implemented using one or more of the one or more hardware processors, configured to, using the detected external library calls as keys, search the code pattern database to retrieve, of the libraries and IP cores, those corresponding to the detected external library calls as replacement-destination libraries/IP cores, thereby to extract offloadable processing that can be offloaded by the retrieved replacement-destination libraries/IP cores as offloadable replacement sources; a replacement processing section, implemented using one or more of the one or more hardware processors, configured to replace processing descriptions of the offloadable replacement sources with processing descriptions of the replacement-destination libraries/IP cores and to generate interfaces that interface a CPU to the replacement-destination libraries/IP cores; an offload pattern generation section, implemented using one or more of the one or more hardware processors, configured to generate one or more offload patterns each of which designates, for each of the offloadable replacement sources, whether to offload the processing to be performed by the offloadable replacement source; an execution file generation section, implemented using one or more of the one or more hardware processors, configured to, for each of the one or more offload patterns, compile the application according to the offload pattern to generate an execution file; and a performance measurement section, implemented using one or more of the one or more hardware processors, configured to, for each of the generated execution files, deploy the generated execution file to an accelerator verification device and perform processing for a measurement of a performance obtained when offloading to the GPU and/or the PLD is performed. The execution file generation section is configured to select an offload pattern with a highest processing performance from the one or more offload patterns on the basis of a result of the performance measurement by the processing for the measurement of the performance, and compile the application according to the offload pattern with the highest processing performance to generate a final execution file.

Effect of the Invention

According to the present invention, it is possible to increase the speed of offload processing in automatic offloading to a PLD.

MODES FOR CARRYING OUT THE INVENTION

An offload server 1 and others in a mode for carrying out the present invention (hereinafter referred to as "present embodiment") will now be described.

In the following description herein, an example will be described where the present invention is applied to an FPGA (Field Programmable Gate Array) as a PLD (Programmable Logic Device). The present invention is applicable to programmable logic devices in general.

DESCRIPTION OF BACKGROUND

When considering offloading specific time-consuming loop statements to an FPGA to increase the speed, it is difficult to predict which loop should be offloaded to increase the speed.

For this reason, Non-Patent Literature 3 makes mention of automatically performing trial and error in a verification environment, like the case of GPUs. However, unlike the case of GPUs, it takes several hours or more to perform compilation in the case of FPGAs. Thus, the measurement for trial is performed after narrowing down the loop statements of the offload candidates.

However, in particular when increasing the speed with FPGAs, it is often the case that the algorithm is modified from a CPU-based algorithm to an algorithm suitable for hardware processing to increase the speed. For this reason, it is often the case that the performance obtained only by simple offloading of loop statements is insufficient compared to manually changing the algorithm to increase the speed. For example, taking a case of matrix multiplication as an example, as it is difficult to have all the data of the matrix in the local memory of an FPGA, there is an example in which acceleration is performed by an algorithm such that data A is read in the row direction and then data B is read in the column direction, to make good use of the local memory having a capacity limit. Even in the case of GPU, an example is cuFFT of CUDA library, which implements Fourier transformation accelerated with GPU using an algorithm suitable for GPU.

However, it is currently difficult for a machine to automatically extract such an algorithm modification for processing hardware according to an application.

In view of this, the present invention replaces, rather than individual loop statements, a larger unit such as matrix integration and Fourier transformation with a functional block implemented including algorithms for hardware such as an FPGA and/or a GPU. In this way, the existing know-how of people will be utilized to increase the speed of the offload processing.

Embodiment

Figure 1:
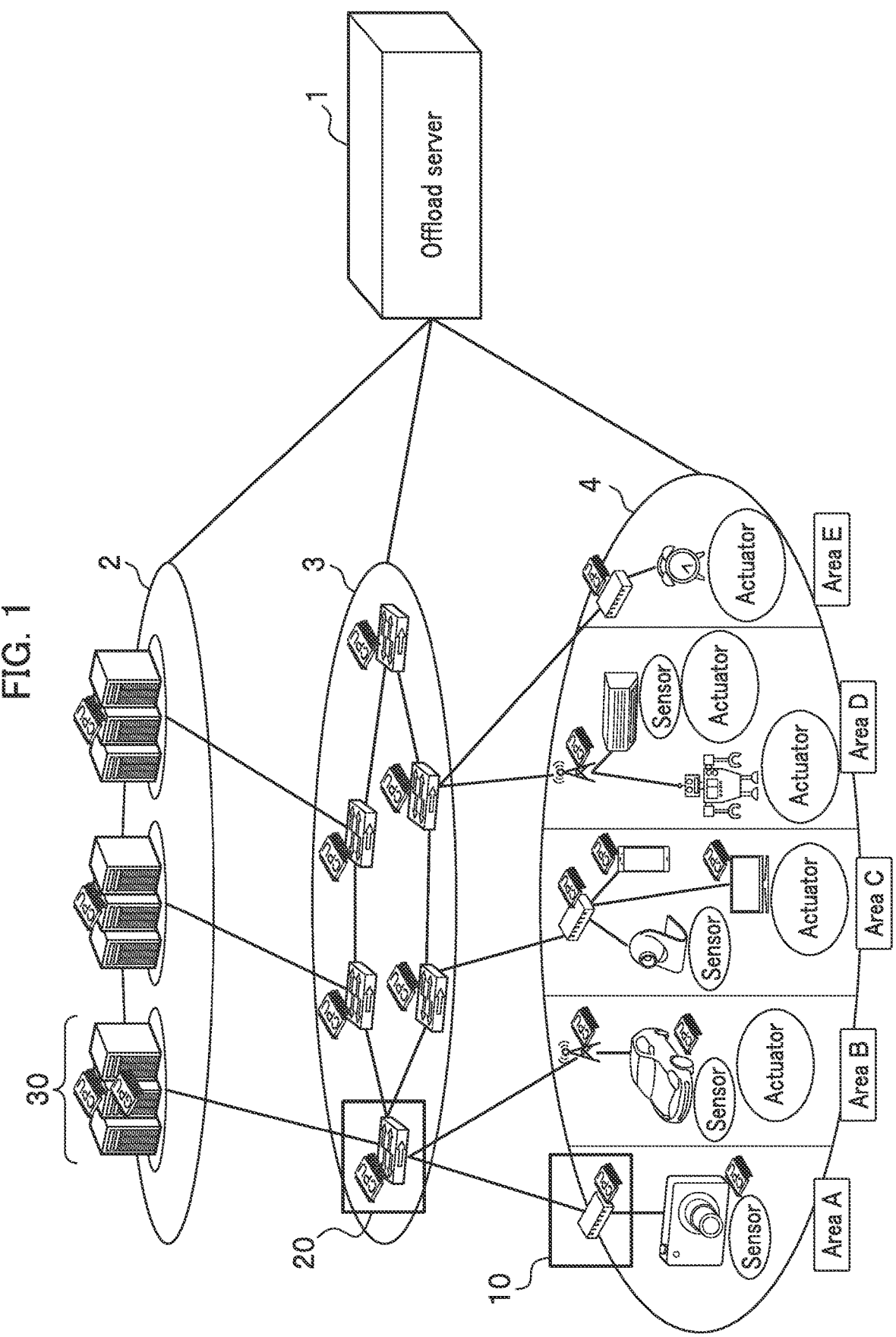
FIG. 1 is a diagram illustrating an environment adaptive software system including an offload server according to an embodiment of the present invention.

FIG. 1 is a diagram illustrating an environment adaptive software system including an offload server 1 according to the present embodiment.

The environment adaptive software system according to the present embodiment is characterized by including the offload server 1 in addition to the configuration of a conventional environment adaptive software. The offload server 1 is an offload server that offloads specific processing of an application to an accelerator. Further, the offload server 1 is communicatively connected to devices located in three layers, namely, a cloud layer 2, a network layer 3 and a device layer 4. Data centers 30 are deployed in the cloud layer 2, network edges 20 are deployed in the network layer 3, and gateways 10 are deployed in the device layer 4.

The environment adaptive software system including the offload server 1 according to the present embodiment achieves efficiency enhancement by appropriately performing function deployment and processing offloading in each of the device layer, the network layer, and the cloud layer. Mainly, the system attempts to achieve: function deployment efficiency enhancement for deploying functions in appropriate places in three layers to perform processes; and efficiency enhancement by offloading the functional processing, such as image analysis, to heterogeneous hardware, such as GPUs and FPGAs. In the cloud layer, an increasing number of servers including heterogeneous HW (hardware) (hereinafter referred to as "hetero device") such as GPUs and FPGAs are used. For example, FPGAs are also used in Bing Search provided by Microsoft (registered trademark) Corporation. In this way, performance enhancement is achieved by exploiting hetero devices to offload matrix calculations and the like, for example, to a GPU and offload specific processing such as FFT (Fast Fourier Transform) computation to an FPGA.

Hereinafter, a description will be given of an example configuration in which the offload server 1 according to the present embodiment performs offload processing in the background while services for users are being used in the environment adaptive software system.

When a service is provided, it is assumed that on the first day the service is provided to a user as trial use while offload processing of image analysis is performed in the background, then on the next day and from then on, image analysis is offloaded to an FPGA so that the watching service can be provided at a reasonable price.

Figure 2:
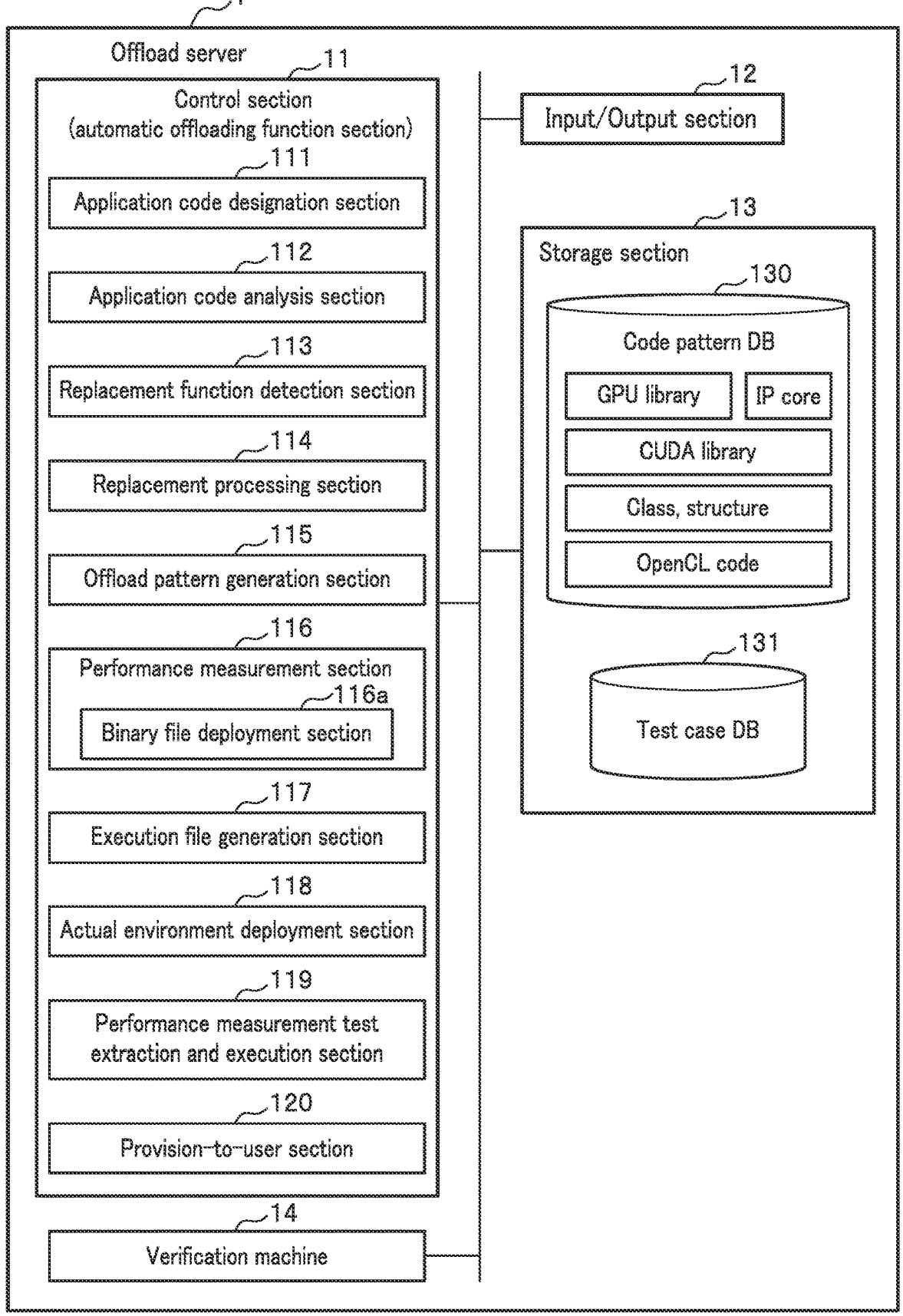
FIG. 2 is a functional block diagram illustrating an example configuration of the offload server according to the embodiment.

FIG. 2 is a functional block diagram illustrating an exemplary configuration of the offload server 1 according to the embodiment of the present invention.

The offload server 1 is a device that automatically offloads specific processing of an application to an accelerator.

Further, the offload server 1 can be connected to an emulator.

As illustrated in FIG. 2, the offload server 1 includes a control section 11, an input/output section 12, a storage section 13, and a verification machine 14 (accelerator verification device).

The input/output section 12 includes a communication interface for transmitting and receiving information to and from devices and an input/output interface for sending and receiving information to and from input devices such as a touch panel or a keyboard and output devices such as a monitor.

The storage section 13 is composed of a hard disk, a flash memory, a Random Access Memory (RAM), or the like, and temporarily stores programs (offload programs) for executing each function of the control section 11 and information (for example, an intermediate language file (intermediate file) 132) required for processes of the control section 11.

The storage section 13 includes a code pattern database (DB) 130 (described below) and a test case database (DB) 131.

The test case database 131 stores performance test items. The test case database 131 stores information for performing a test for measuring the performance of an application to be accelerated. For example, in the case of a deep learning application for image analysis processing, sample images and test items for testing execution of the image analysis processing.

The verification machine 14 includes, as a verification environment for environment adaptive software, a CPU (Central Processing Unit), a GPU, and an FPGA (accelerator).

<Code Pattern Database 130>

Storage of GPU library and IP core

The code pattern database 130 stores libraries and IP cores (described below) that can be offloaded to a GPU, an FPGA, or the like. In other words, the code pattern database 130 retains, for <Processing B-1> described below, specific libraries, libraries for GPUs (GPU libraries) and IP cores for FPGAs (IP cores) that increase the speed of functional blocks, and information related to them. For example, the code pattern database 130 retains a library list (external library list) of arithmetic calculations such as FFT.

Storage of CUDA Library

The code pattern database 130 stores, as the GPU library, a CUDA library and a library usage procedure for using the CUDA library, for example. In other words, in <Processing C-1> described below, for a case of implementing a replacement library or IP core to a GPU or FPGA and connecting it to the host side (CPU) program, the replacement library or IP core is registered along with a library usage procedure and the replacement library or IP core is used in accordance with the procedure. For example, in the case of CUDA library, the procedure for using the CUDA library from C language code is published together with the library, and thus the library usage procedure is also registered in the code pattern database 130.

Storage of Classes and Structures

The code pattern database 130 stores classes or structures whose descriptions would be described in a similar fashion in cases their computations are to be performed on the host. In other words, in <Processing B-2> described below, classes, structures, and the like are detected from definition descriptions in the source code using syntax analysis, in order to detect not-registered functional processing other than library calls. The code pattern database 130 registers classes or structures whose descriptions would each be described in a similar fashion in cases processing of the classes and the structures is to be performed on a host, for <Processing B-2> described below. Note that a similarity detection tool (described below) is used to detect the fact that there is a library or IP core that increases the speed of the functional processing of a class or structure.

Storage of OpenCL Code

The code pattern database 130 stores OpenCL codes as IP core related information. As the OpenCL codes are stored in the code pattern database 130, it is possible to make a connection between a CPU and an FPGA using an OpenCL interface and to implement an IP core to an FPGA using the OpenCL codes via a high-level synthesis tool (described below) of an FPGA vendor, such as Xilinx or Intel.

<Control Section 11>

The control section 11 is an automatic offloading function section that controls the entire offload server 1, and is embodied when a CPU (not illustrated) loads a program (offload program) stored in the storage section 13 in the RAM and executes it.

In particular, the control section 11 detects, in an existing CPU-based program code, functional blocks which can be offloaded to an FPGA or GPU to increase the speed of the processing, replace the detected functional blocks with a GPU-based library, an FPGA-based IP core, or the like, thereby to perform offload processing of the functional blocks to be speeded up.

The control section 11 includes an application code designation section 111 (configured to designate application code), an application code analysis section 112 (configured to analyze application code), a replacement function detection section 113, a replacement processing section 114, an offload pattern generation section 115, a performance measurement section 116, an execution file generation section 117, an actual environment deployment section 118 (configured to deploy final binary files to actual environment) a performance measurement test extraction and execution section 119 (configured to extract performance test cases and run automatically), and a provision-to-user section 120 (configured to provide price and performance to a user to make determination)

<Application Code Designation Section 111>

The application code designation section 111 designates the input application code. Specifically, the application code designation section 111 identifies the processing function (such as image analysis) of the service being provided to a user.

<Application Code Analysis Section 112>

The application code analysis section 112 analyzes the source code of the application in <Processing A-1> described below and detects calls, included in the source code, to external libraries. Specifically, the application code analysis section 112, using a syntax analysis tool such as Clang, performs analysis of the source code to analyze, in addition to loop statement structures or the like, library calls and functional processing included in the code.

It is difficult to generalize the above-described code analysis because the analysis needs to take into consideration the device to which offloading is to be performed. However, it is possible to identify the structure of code such as reference relationships between loop statements and variables and to identify functional blocks that perform FFT processing or calls to a library that performs FFT processing. It may be difficult for the offload server to automatically identify such functional blocks. Such functional blocks can be identified through similarity determination using a similarity detection tool such as Deckard. Here, Clang is a tool for C/C++. A tool that is appropriate for the language to be analyzed need to be selected.

The application code analysis section 112 detects codes of classes or structures from the source code in <Processing A-2> described below.

<Replacement Function Detection Section 113>

The replacement function detection section 113 retrieves GPU libraries and IP cores from the code pattern database 130 using the detected calls as keys in <Processing B-1> described below. Specifically, upon detection of a call to a library, the replacement function detection section 113 checks the code pattern database 130 using the library name as a key, to extract offloadable processing that can be offloaded to the GPU or the FPGA.

Here, the code pattern database 130 stores, for example, a CUDA library and a library usage procedure for using the CUDA library, as a GPU library. Then, the replacement function detection section 113 retrieves the CUDA library from the code pattern database 130 on the basis of the library usage procedure.

The replacement function detection section 113 retrieves GPU libraries and IP cores from the code pattern database 130 using the definition description codes of the detected classes or structures (described below) as keys in <Processing B-2> described below. Specifically, for a class or structure included in the replacement source code, the replacement function detection section 113 extracts from the code pattern database 130 a GPU library or IP core which is managed in association with a similar class or structure and is usable for offloading the class or structure to the GPU or FPGA, using a similarity detection tool that detects copied codes and/or definition description codes which have been modified after being copied.

<Replacement Processing Section 114>

In <Processing C-1> described below, the replacement processing section 114 replaces the processing descriptions of the replacement sources of the source code of the application with the processing descriptions of the replacement destination libraries and IP cores retrieved by the replacement function detection section 113. Specifically, the replacement processing section 114 replaces the extracted offloadable processing with GPU-based libraries and/or FPGA-based IP cores or the like.

The replacement processing section 114 offloads the processing descriptions of the replacement libraries and IP cores to the GPU and FPGA, or the like as functional blocks to be offloaded. Specifically, the replacement processing section 114 offloads functional blocks which are replaced with GPU-based libraries and/or FPGA-based IP cores or the like by generating interfaces with the CPU program. The replacement processing section 114 outputs an intermediate language file 132 such as CUDA and/or OpenCL.

In <Processing C-2> described below, the replacement processing section 114 replaces the processing descriptions to be replaced from the source code of the application with the processing descriptions of the retrieved libraries and IP cores, and makes a notification for confirmation when the number or types of the arguments and return values differ between the replacement sources and the replacement destinations.

<Offload Pattern Generation Section 115>

The offload pattern generation section 115 generates one or more offloading patterns. Specifically, the offload pattern generation section 115 generates interfaces with a host program and perform trials of offloading and trials of not offloading through performance measurements in a verification environment, to extract an offload pattern that leads to higher speed.

Here, the code pattern database 130 stores the OpenCL codes as IP core related information. In a case of offloading to a PLD such as an FPGA, the offload pattern generation section 115 connects the host and the PLD using the OpenCL interface based on the OpenCL code, and performs implementation of the IP core to the PLD based on the OpenCL code.

A description will be given of the interface description of the kernel program and the host program according to the API of OpenCL. Note that the following description corresponds to a specific example of <Processing C-1> of below-described [Processing C] (matching of the interface with the host side).

A kernel created in accordance with the grammar of OpenCL C language is executed on a device (e.g., FPGA) by a host side program (e.g., CPU side program), using a runtime API of OpenCL C language. A portion that calls the kernel function hello( ) from the host is a call to clEnqueue-Task( ), which is one of the OpenCL runtime APIs.

The basic flow of initialization, execution, and termination of the OpenCL, to be described in a host code, is described below as step 1 through step 13. Step 1 through step 10 in the steps from step 1 to step 13 are a procedure (preparation) prior to calling the kernel function hello( ) from the host and the kernel is executed in step 11.

1. Platform Identification

A platform on which OpenCL operates is identified using function clGetPlatformIDs( ), which is defined in OpenCL runtime API to provide a platform identification function.

2. Device Identification

A device, e.g., a GPU, used on the platform is identified using function clGetDeviceIDs( ), which is defined in OpenCL runtime API to provide a device identification function.

3. Context Creation

An OpenCL context, which is an execution environment to run OpenCL, is created using function clCreateContext ( ), which is defined in OpenCL runtime API to provide a context creation function.

4. Command Queue Creation

A command queue is created to be ready for controlling the device, using function clCreateCommandQueue( ), which is defined in OpenCL runtime API to provide a command queue creation function. In OpenCL, actions (issuances of kernel execution commands and host-device memory copy commands) from a host to a device are performed through a command queue.

5. Memory Object Creation

A memory object that allows the host to reference the memory object is created using function clCreateBuffer( ), which is defined in the OpenCL runtime API to provide the ability to allocate memory on the device.

6. Kernel File Reading

The host program controls execution of a kernel executed on the device. Therefore, the host program first needs to read kernel programs. Kernel programs include binary data created by OpenCL compiler and source code written in OpenCL C language. These kernel files are read (detailed description of which is omitted). It should be noted that the OpenCL runtime API is not used when reading kernel files.

7. Program Object Creation

In OpenCL, the kernel program is recognized as a program object. This procedure is the program object creation.

A program object that allows the host to reference the memory object is created using function clCreateProgramWithSource( ), which is defined in the OpenCL runtime API to provide a function of creating a program object. When the program object is to be created from a compiled binary sequence of a kernel program, clCreateProgramWithBinary( ) is used.

8. Build

OpenCL C compiler/linker is used to build the program object registered as source code.

The program object is built using function clBuildProgram( ), which is defined in the OpenCL runtime API to perform a build by the OpenCL C compiler/linker. It should be noted that if the program object has been generated from a compiled binary sequence by using clCreateProgramWithBinary( ), this compile procedure is not needed.

9. Kernel Object Creation

Kernel objects are created using function clCreateKernel ( ), which is defined in the OpenCL runtime API to provide the ability to create a kernel object. A kernel function name (hello) is specified when creating a kernel object because one kernel object corresponds to one kernel function. Further, when a plurality of kernel functions are described as one program object, clCreateKernel( ) is called multiple times because one kernel object corresponds to one kernel function on a one-to-one basis.

10. Kernel Argument Setting

Kernel arguments are set using function clSetKernel( ), which is defined in the OpenCL runtime API to provide the ability to provide arguments to a kernel (to pass values to arguments of the kernel function).

The above-described steps 1 through 10 complete the preparation, and the processing flow proceeds to step 11, where the kernel is executed on the device from the host.

11. Kernel Execution

Kernel execution (queueing to the command queue) is performed by a queueing function for queueing to the command queue because the kernel execution is an action to the device.

A command to execute the kernel hello on the device is queued using function clEnqueueTask( ), which is defined in the OpenCL runtime API to provide the ability to execute a kernel. After the command to execute the kernel hello is enqueued, the command is executed on an arithmetic operation unit that can execute the command on the device.

12. Read from Memory Object

Data is copied from a memory area of the device to a memory area of the host using function clEnqueueReadBuffer( ), which is defined in the OpenCL runtime API to provide the ability to copy data from a memory of a device to a memory of a host. In addition, data is copied from a memory area of the host to a memory area of the device using function clEnqueueWriteBuffer( ), which provides a function of copying data from a host to a memory of the device. It should be noted that because these functions are actions to the device, the copy command is first queued into the command queue, then the data copy starts.

13. Object Release

Lastly, the various objects having been created are released.

Heretofore, device execution by the kernels created in accordance with the OpenCL C language has been described.

<Performance Measurement Section 116>

The performance measurement section 116 compiles the application according to the generated processing pattern, deploys the compiled application to the verification machine 14, and performs processing for measuring the performance obtained when offloading the compiled application to the GPU or FPGA.

The performance measurement section 116 includes a binary file deployment section 116a (configured to deploy binary files). The binary file deployment section 116a deploys an execution file derived from the intermediate language to a verification machine 14 equipped with a GPU and/or an FPGA.

The performance measurement section 116 executes the deployed binary file, measures the performance obtained when offloading is performed and returns the result of the performance measurement to the binary file deployment section 116a. In this case, the performance measurement section 116 carries out a performance measurement for trial based on extracted intermediate language, using another extracted processing pattern (see reference character e in FIG. 3 described below).

A description will be given of a specific example of performance measurement.

The offload pattern generation section 115 creates processing patterns that offload functional blocks that can be offloaded to the GPU or the FPGA, and the execution file generation section 117 compiles the intermediate languages of the created processing patterns. The performance measurement section 116 measures the performances of the compiled programs ("first performance measurement").

From the processing patterns having been subjected to the performance measurement, the offload pattern generation section 115 makes a list of processing patterns with improved performance compared with when executed on the CPU. The offload pattern generation section 115 combines the listed processing patterns to generate new processing patterns of offloading. The offload pattern generation section 115 generates combined offload processing patterns and intermediate languages, and the execution file generation section compiles the intermediate languages.

The performance measurement section 116 measures the performance of the compiled programs ("second performance measurement").

<Execution File Generation Section 117>

The execution file generation section 117 compiles the intermediate languages of the processing patterns of offloading and creates the execution files. The execution file generation section 117 selects a processing pattern with the highest processing performance from one or more processing patterns on the basis of the result of the performance measurement repeated for a predetermined number of times and compiles the selected processing pattern with the highest processing performance to generate an execution file.

<Actual Environment Deployment Section 118>

The actual environment deployment section 118 deploys the generated execution file to the actual environment for user ("deployment of final binary file to actual environment"). The actual environment deployment section 118 determines a pattern that designates the final offload areas, and deploys the pattern to the actual environment for the user.

<Performance Measurement Test Extraction and Execution Section 119>

After the execution file is deployed, a performance measurement test extraction and execution section 119 extracts performance test items from the test case database 131 and performs a performance test.

After the execution file is deployed, the performance measurement test extraction and execution section 119 extracts performance test items from the test case database 131, and performs an automatic execution of the extracted performance test in order to indicate the performance to the user.

<Provision-to-User Section 120>

The provision-to-user section 120 presents, to the user, information on the price, performance and the like based on the result of the performance test ("provision of information on price, performance and the like to user"). The test case database 131 stores data for automatically performing the test for measuring the performance of the application. The provision-to-user section 120 presents, to the user, the result of the execution of the test data of the test case database 131 and the price of the entire system, which is determined from the unit prices of the resources (e.g., virtual machines, FPGA instances and GPU instances) used in the system. On the basis of the presented information on the price, performance and the like, the user determines whether to start using the service with billing.

A description will be given of the offload processing performed to the functional blocks by the offload server 1 configured as described above.

A description will be given of the outline of the above-described offload processing to the functional blocks and points to be considered with respect to that offload processing.

Regarding FPGAs, as it takes a large amount of time to design the hardware circuit, the designed functions are often to be made reusable in the form of an Intellectual Property Core (IP core). The IP core is partial circuit information for configuring a semiconductor such as an FPGA, an IC, and an LSI, and is particularly organized in function units. Typical functional examples of an IP core include encryption/decryption processing, arithmetic calculations such as Fast Fourier Transform (FFT), image processing, and voice processing. Many IP cores require a license fee, but some are provided free of charge.

In the present embodiment, with respect to FPGA, IP cores are utilized for automatic offloading. With respect to GPU, FFT, linear algebra arithmetic operations, and the like are typical functional examples; and cuFFT, cuBLAS, or the like implemented using CUDA are provided free of charge as GPU-based libraries, though it is not called an IP core. In the present embodiment, these libraries are utilized with respect to GPU.

When an existing program code made for CPUs includes a functional block, such as FFT processing, which can be accelerated by being offloaded to a GPU or FPGA, the present embodiment replaces such functional block with a GPU-based library or an FPGA-based IP core or the like to accelerate the processing.

Outline of Offload Processing of Functional Blocks

The offload server 1 according to present embodiment is an example applied to GPU and/or FPGA automatic offloading of a user application logic as an elemental technology of environment adaptive software.

Figure 3:
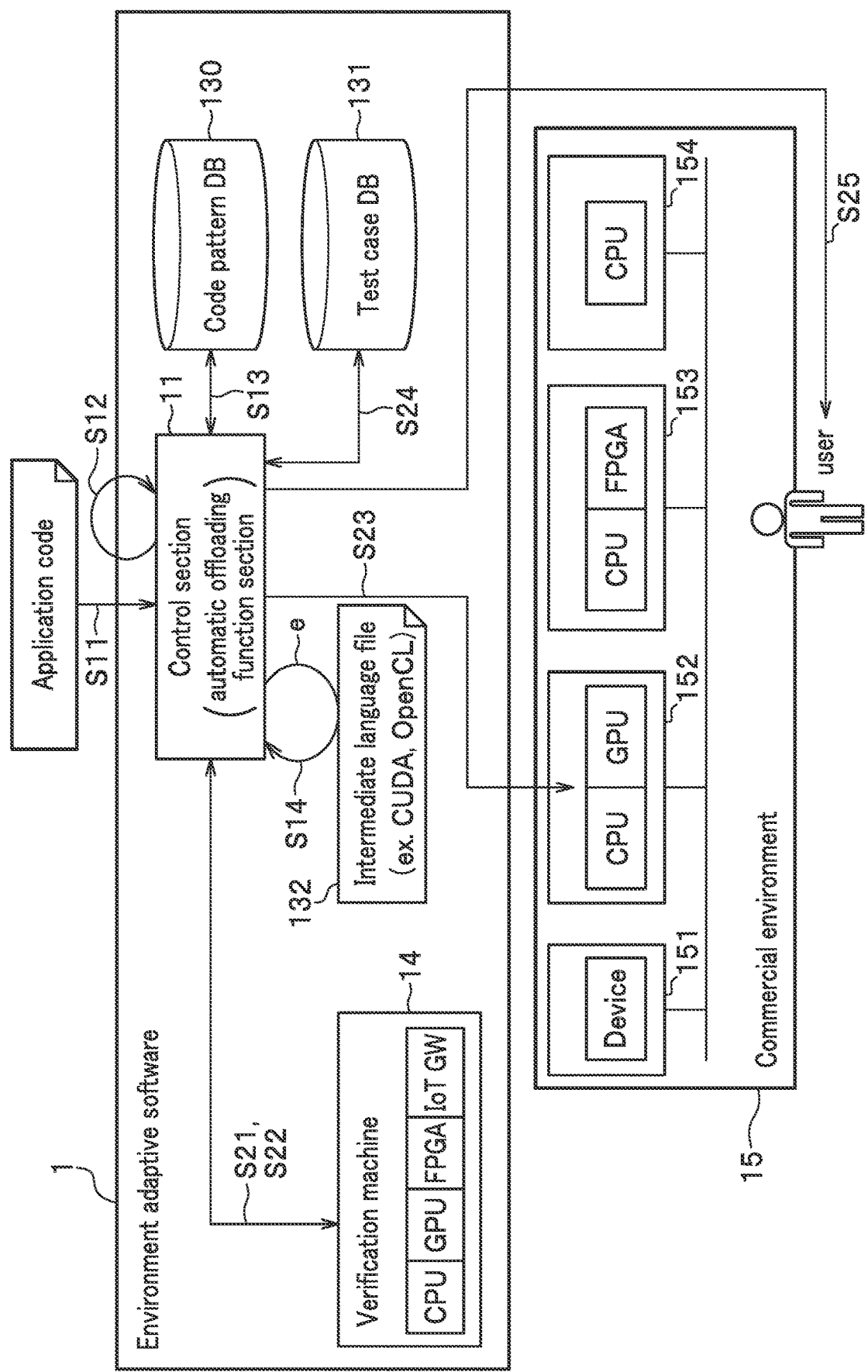
FIG. 3 is a diagram illustrating offload processing of functional blocks of the offload server according to the above-described embodiment.

FIG. 3 is a diagram illustrating the offload processing performed to the functional blocks by the offload server 1.

As illustrated in FIG. 3, the offload server 1 is applied to elemental technology of environment adaptive software. The offload server 1 includes a control section (automatic offloading function section) 11, a code pattern database 130, a test case database 131, an intermediate language file 132, and a verification machine 14.

The offload server 1 retrieves application code 130 to be used by a user.

The user uses a device 151 of any of various types, a CPU-GPU-equipped device 152, a CPU-FPGA-equipped device 153, and a CPU-equipped device 154, for example. The offload server 1 automatically offloads functional processing to an accelerator of the CPU-GPU-equipped device 152 and to an accelerator of the CPU-FPGA-equipped device 153.

Operations of each section will be described with reference to the step numbers in FIG. 3.

<Step S11: Specify Application Code>

In step S11, the application code designation section 111 (see FIG. 2) identifies the processing function (such as image analysis) of the service being provided to the user. Specifically, the application code designation section 111 designates the input application code.

<Step S12: Analyze Application Code> (Code Analysis)

In step S12, the application code analysis section 112 (see FIG. 2), using a syntax analysis tool such as Clang, performs analysis of the source code to analyze, in addition to loop statement structures or the like, library calls and functional processing included in the code.

<Step S13: Extract Offloadable Area> (Extraction of Offloadable Processing)

In step S13, the replacement function detection section 113 (see FIG. 2) checks the code pattern database 130 with respect to the identified library calls and functional processing, to extract offloadable processing that can be offloaded to the GPU or FPGA.

<Step S14: Output Intermediate File> (Output Intermediate File for Offloading)

In step S14, the replacement processing section 114 (see FIG. 2) replaces the extracted offloadable processing with GPU-based libraries and/or FPGA-based IP cores or the like. The replacement processing section 114 offloads functional blocks which are replaced with the GPU-based libraries and/or FPGA-based IP cores or the like by generating interfaces with the CPU program. The replacement processing section 114 outputs an intermediate language file 132 according to CUDA and/or OpenCL or the like. The intermediate language extraction is not ended at one time, but is repeated for optimization through execution trials to search for appropriate offload areas.

Here, whether the offloadable processing immediately leads to acceleration and whether the cost effectiveness is sufficient are not known yet. So the offload pattern generation section 115 performs trials of offloading and not offloading through performance measurements in a verification environment, to extract an offload pattern that leads to acceleration.

<Step S21: Deploy Binary Files> (Deployment, Performance Measurement Trial)

At step S21, the binary file deployment section 116a (see FIG. 2) deploys an execution file derived from the intermediate language to the verification machine 14 equipped with a GPU and/or an FPGA. The binary file deployment section 116a launches the deployed file and executes an assumed test case to measure the performance obtained when offloading is performed.

<Step S22: Measure Performances>

In step S22, the performance measurement section 116 (see FIG. 2) executes the deployed file to measure the performance obtained when offloading is performed.

As indicated by reference character e in FIG. 3, the control section 11 repeatedly executes the above-described steps from step S12 to step S22. The automatic offloading function of the control section 11 is summarized as follows. The application code analysis section 112, using a syntax analysis tool such as Clang, performs analysis of the source code to analyze, in addition to loop statement structures or the like, library calls and functional processing included in the code. The replacement function detection section 113 checks the code pattern database 130 with respect to the detected library calls and functional processing, to extract offloadable processing that can be offloaded to the GPU and/or FPGA. The replacement processing section 114 replaces the extracted offloadable processing with GPU-based libraries and/or FPGA-based IP cores or the like. Then, the offload pattern generation section 115 offloads the functional blocks which are replaced with GPU-based libraries and/or FPGA-based IP cores or the like by generating interfaces with the CPU program.

<Step S23: Deploy Final Binary Files to Actual Environment>

In step S23, the actual environment deployment section 118 determines a pattern that designates the final offload areas, and deploys the pattern to the actual environment for the user.

<Step S24: Extract Performance Test Cases and Run Automatically>

In step S24, after the execution file is deployed, the performance measurement test extraction and execution section 119 extracts performance test items from the test case database 131, and performs an automatic execution of the extracted performance test in order to indicate the performance to the user.

<Step S25: Provide Price and Performance to a User to Judge>

In step S25, the provision-to-user section 120 presents, to the user, information on the price, performance and the like based on the result of the performance test. On the basis of the presented information on the price, performance and the like, the user determines whether to start using the service with billing.

The above-described steps from step S11 to step S25 are performed in the background of service use of the user, and are assumed to be performed on the first day of temporary use of the service, for example. Further, in order to reduce the cost, the processing to be performed in the background may be performed only for offloading to a GPU/FPGA.

As described above, when the offload server 1 is applied to an elemental technology of environment adaptive software, the control section (automatic offloading function section) 11 of the offload server 1 extracts the areas to be offloaded from the source code of the application used by the user and outputs an intermediate language, in order to offload functional processing (steps S11 to S14). The control section 11 deploys the execution file derived from the intermediate language to the verification machine 14 and causes the verification machine 14 to execute the execution file to verify the effect of offloading (steps S21 to S22). The control section 11 repeats the verification, then determines appropriate offload areas, and then deploys the execution file to an actual environment that is actually provided to the user, to provide the execution file as a service (steps S23 to S25).

The processing flow of collectively performing the code conversion, and the deployment place adjustment, which are required for environment adaptation, has been described. However, it should be noted that this is not limiting and only desired processing may be extracted. For example, when only a code conversion is desired to be performed for a GPU or an FPGA, it is possible to use only the environment adaptation function and the verification environment in the steps S11 to S22.

In general, it is difficult to automatically find a setting that results in the maximum performance on the first try. Thus, a feature of the present invention is to try offload patterns several times in a verification environment while repeating performance measurement, thereby finding a pattern that can achieve acceleration.

Details of Offload Processing of Functional Blocks

Regarding offloading of functional blocks, it is necessary to consider three elements including detection of a functional block (hereinafter referred to as "Processing A"), detection of whether an existing library/IP core or the like for offloading the functional block is available (hereinafter referred to as "Processing B"), and matching of the interface with the host when the functional block is replaced with the library/IP core or the like (hereinafter referred to as "Processing C"). The offload processing of the functional blocks will be described in detail with respect to the three elements for consideration.

[Processing A] (Detection of Functional Blocks)

Processing A (detection of functional blocks) is divided into <Processing A-1>, which makes a function call to a library and sets the function call to the library as a functional block, and <Processing A-2>, which, in cases of a function call to a library that is not registered, detects a class, structure, or the like and sets it as a functional block. In other words, <Processing A-1> is to detect a function call to an existing library and to set it as a functional block, and <Processing A-2> is to, in cases where no functional block is detected in <Processing A-1>, extract a functional block from a class or structure.

<Processing A-1>

The application code analysis section 112 detects, from the source code, a function call to an external library is to be made, using syntax analysis. The details are as follows. The code pattern database 130 retains a library list of arithmetic calculations such as FFT. The application code analysis section 112 performs syntax analysis on the source code, compares the source code with the library list retained in the code pattern database 130, and detects that a function call to an external library is to be made.

<Processing A-2>

Using syntax analysis, the application code analysis section 112 detects the functional processing of classes or structures from the definition description of the source code, in order to detect not-registered functional processing other than library calls as functional blocks. The application code analysis section 112 detects, for example, a structure, which is a type defined using 'struct' of C language to organize several variables, and a class which is a reference type of a structure whose instantiated object is a value type. The application code analysis section 112 detects a class that is used as an alternative to the structure in Java (registered trademark), for example.

[Processing B] (Detection of Offloadable Function)

[Processing B] (Detection of offloadable function) is divided into <Processing B-1>, which, in response to <Processing A-1>, consults the code pattern database 130 to retrieve GPU libraries and/or IP cores usable for replacement, and <Processing B-2>, which, in response to <Processing A-2>, replaces the processing descriptions of the replacement sources of the application code with the processing descriptions of the GPU libraries and/or IP cores of the replacement destinations. In other words, <Processing B-1> is to retrieve GPU libraries and/or IP cores usable for replacement from the code pattern database 130 using the library names as keys. <Processing B-2> is to detect GPU libraries and/or IP cores usable for replacement using the codes of the classes, structures, or the like as keys, and to replace the processing descriptions of the replacement sources of the application code with the processing descriptions of the GPU libraries and/or IP cores of the replacement destinations.

As a premise of the processing B, the code pattern database 130 retains: GPU libraries and FPGA IP cores for accelerating specific libraries and functional blocks; and information related to them. In the code pattern database 130, with respect to the libraries and functional blocks of the replacement source, codes and execution files are registered together with the function names.

<Processing B-1>

The replacement function detection section 113 searches, with respect to the library calls detected by the application code analysis section 112 in <Processing A-1>, the code pattern database 130 using the library names as keys, and retrieves GPU libraries (GPU libraries that can perform acceleration) and/or FPGA IP cores from the code pattern database 130.

A description will be given of an example of <Processing B-1>.

For example, in a case where the processing of a replacement source is processing of 2D FFT (code can be found in Non-Patent Literature 4 or the like), the replacement function detection section 113 detects an OpenCL code (code can be found in Non-Patent Literature 5 or the like) as FPGA processing for processing 2D FFT (e.g., main.cpp (host program), fft2d.c1 (kernel program)), using the external library name as the key. Note that the OpenCL code is stored in the code pattern database 130.

For example, in a case where the processing of a replacement source is processing of 2D FFT, the replacement function detection section 113 replaces the processing with a function call to Function cufftPlan2d( ), which is a function in cuFFT detected as the GPU library. Note that the GPU library is stored in the code pattern database 130.

<Processing B-2>

The replacement function detection section 113 searches the code pattern database 130 using the codes of the classes, structures, and the like detected by the application code analysis section 112 in <Processing A-2> as keys. Then the replacement function detection section 113, using a similarity detection tool, retrieves from the code pattern database 130 GPU libraries (library for GPU to perform acceleration) and/or an FPGA IP cores, which are usable for replacement. The similarity detection tool is a tool that is configured to detect copied codes and/or codes which have been modified after being copied. Examples of such a tool include Deckard. By using the similarity detection tool, the replacement function detection section 113 can detect, in part: processing, such as a code of matrix calculation, whose descriptions would each be described in a similar fashion in cases their computations are to be performed on a CPU; and processing in which code of another party is copied and modified, and the like. Note that the similarity detection tool is out of scope for a newly independently created class or the like because it is difficult to detect.

A description will be given of an example of <Processing B-2>.

The replacement function detection section 113 searches for a similar class or structure registered in the code pattern database 130 by using a similarity detection tool, such as Deckard, with respect to the class or structure detected in the replacement-source CPU code. For example, in a case where the processing of the replacement source (code can be found in Non-Patent Literature 4 or the like) is a class of 2D FFT, a 2D FFT class registered in the code pattern database 130 is detected as its similar class. An IP core and/or GPU library capable of offloading 2D FFT is registered in the code pattern database 130. Accordingly, in a manner similar to <Processing B-1>, an OpenCL code (main.cpp (host program), fft2d.c1 (kernel program), and the like) and/or a GPU library (cuFFT Function cufftPlan2d ( )) is detected with respect to the 2D FFT.

[Processing C] (Matching of Interface with Host)

[Processing C] (Matching of interface with host) includes <Processing C-1> and <Processing C-2>. <Processing C-1> replaces, in response to <Processing B-1>, the processing descriptions of the replacement sources of the application code with the processing descriptions of the GPU libraries and/or IP cores of the replacement destination, and describes interface processing for calls to the GPU libraries and/or IP cores. <Processing C-2> replaces, in response to <Processing B-2>, the processing descriptions of the replacement sources of the application code with the processing descriptions of the GPU libraries and/or IP cores of the replacement destinations, and describes interface processing for calls to the GPU libraries and/or IP cores. Here, the describing the interface processing for calls to the GPU libraries and/or IP cores corresponds to "Matching of interface with host".

<Processing C-1>

The replacement processing section 114 replaces the processing descriptions of the replacement sources of the application code with the processing descriptions of the GPU libraries and/or IP cores of the replacement destinations. Then, the replacement processing section 114 describes interface processing for calls to the GPU libraries and/or IP cores (OpenCL API and the like), and compiles the created patterns.

<Processing C-1> will be described in more detail.

The replacement function detection section 113 searches for, with respect to the library calls detected in <Processing A-1>, corresponding libraries and/or the IP cores in <Processing B-1>. Accordingly, the replacement processing section 114 implements the libraries and/or IP cores for replacement on the GPU and/or FPGA and performs the interface processing for connecting to the host (CPU) program.

Here, in the case of a GPU library, a library such as CUDA is assumed. Techniques to use the CUDA library from the C language code are publicized together with the library. Thus, a library usage technique is also registered in the code pattern database 130, and the replacement processing section 114 replaces the processing descriptions of the replacement sources of the application code with the GPU libraries of the replacement destination, and specifies predetermined descriptions such as calls to GPU library functions to be used, according to the library usage technique registered in the code pattern database 130.

In the case of an FPGA IP core, HDL or the like is assumed. In this case, OpenCL codes are also retained in the code pattern database 130 as IP core related information. The replacement processing section 114 can perform interface processing with an FPGA via a high-level synthesis tool (for example, Xilinx Vivado, Intel HLS Compiler, and the like). The replacement processing section 114 connects the CPU and the FPGA using the OpenCL interface based on the OpenCL code, for example, via a high-level synthesis tool. Similarly, the replacement processing section 114 implements the IP core to the FPGA via a high-level synthesis tool of an FPGA vendor, such as Xilinx or Intel.

<Processing C-2>

The replacement processing section 114 replaces the processing descriptions of the replacement sources of the application code with processing descriptions of the GPU libraries and/or IP cores of the replacement destinations. Then, when the number and/or types, of the arguments and return value differ between a replacement source and the corresponding replacement destination, the replacement processing section 114 confirms with the user, makes descriptions (OpenCL API and the like) of the interface processing for calls to the GPU libraries and/or IP cores, and compiles the created pattern. In other words, in <Processing C-2>, with respect to the classes, structures, and the like detected in <Processing A-2>, the replacement processing section 114 searches for, in <Processing B-2>, libraries and/or IP cores capable of performing acceleration. Accordingly, in <Processing C-2>, the replacement processing section 114 implements the corresponding libraries and/or IP cores to the GPU and/or FPGA.

<Processing C-2> will be described in more detail.

In the case of <Processing C-1>, as libraries and/or IP cores are to be handled for acceleration with respect to specific library calls, the numbers or the types of the arguments and return values assumed by the GPU and FPGA and those assumed by the host program are in agreement, even though generation or the like of interface portions is required. However, in the case of <Processing B-2>, determination is to be made on the basis of similarity or the like, there is no guarantee that the basic portions such as the numbers and the types of arguments and return values are in agreement. The libraries and the IP cores are existing know-how, and even in a case where the numbers and the types of the arguments and return values are not in agreement, it is not possible to make a modification to them so frequently. For this reason, the user requesting offloading is inquired as to whether to modify the numbers and/or types, of the arguments and/or return values of the original code according to the library and the IP core. Then, after approval is obtained in the confirmation, the offload performance test is performed for trial.

Regarding the difference in type, if it is only necessary to cast between types such as float and double, processing of casting may be additionally performed in the event of generating the processing pattern, and the performance measurement for trial may be performed without user confirmation in particular. In the case where the number of the arguments and/or return value differs between the original program and a library and/or an IP core, for example, in a case where arguments 1 and 2 are required and argument 3 is optional in the CPU program, whereas arguments 1 and 2 are required in the library and/or the IP core, there is no problem even if the optional argument 3 is omitted. In such a case, the optional argument may be automatically treated as being not present in the event of generating the processing pattern, without inquiring the user. Note that in cases where the numbers and/or the types, of the arguments and return values are completely in agreement, the same processing as <Processing C-1> may be performed.

[Flowchart]

Next, an outline of the operation of the offload server 1 will be described with reference to FIGS. 4 and 5.

Flowchart of <Processing A-1>, <Processing B-1>, and <Processing C-1>

Figure 4:
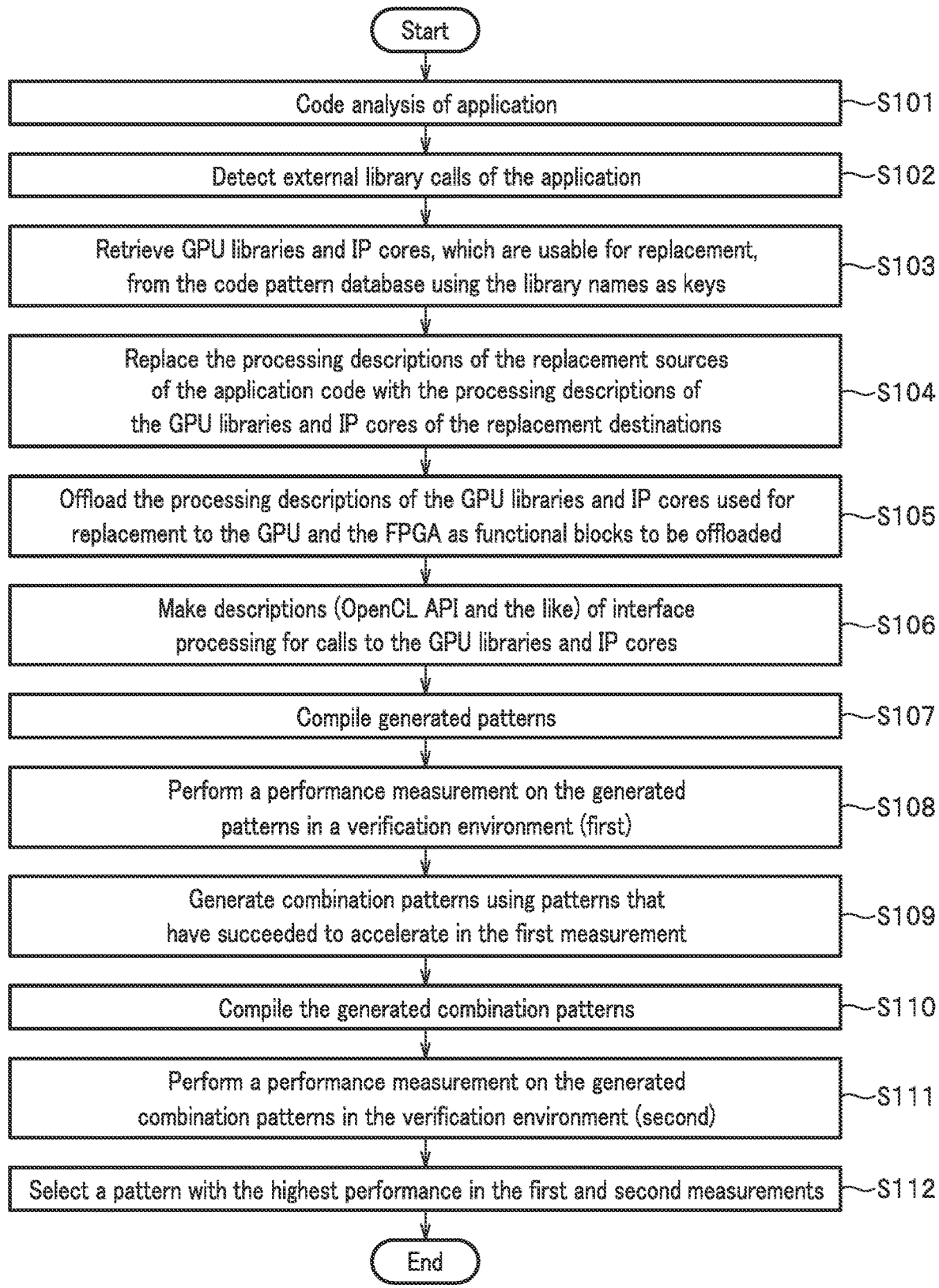
FIG. 4 is a flowchart of a case in which the control section of the offload server according to the above-described embodiment executes <Processing A-1>, <Processing B-1>, and <Processing C-1> in the offload processing of the functional blocks.

FIG. 4 is a flowchart of a case in which the control section (automatic offloading function section) 11 of the offload server 1 performs <Processing A-1>, <Processing B-1>, and <Processing C-1> in the processing of offloading functional blocks.

In step S101, the application code analysis section 112 (see FIG. 2) analyzes application source code desired to be offloaded. Specifically, the application code analysis section 112, using a syntax analysis tool such as Clang, performs analysis of the source code to analyze, in addition to loop statement structures or the like, library calls and functional processing included in the code.

In step S102, the replacement function detection section 113 (see FIG. 2) detects calls from the application to external libraries.

In step S103, the replacement function detection section 113 retrieves GPU libraries and/or IP cores usable for replacement from the code pattern database 130 using the library names as keys. Specifically, the replacement function detection section 113 checks the code pattern database 130 with respect to the identified library calls, to retrieve the detected GPU libraries and/or IP cores usable for replacement as offloadable functional blocks offloadable to the GPU and/or FPGA.

In step S104, the replacement processing section 114 replaces the processing descriptions of the replacement sources of the application code with the processing descriptions of the GPU libraries and/or IP cores of the replacement destinations.

At step S105, the replacement processing section 114 offloads the replaced processing descriptions of the GPU libraries and IP cores to the GPU and the FPGA as functional blocks to be offloaded.

In step S106, the replacement processing section 114 makes descriptions (OpenCL API, and the like) of the interface processing for calls to the GPU libraries and IP cores.

In step S107, the execution file generation section 117 compiles generated patterns.

In step S108, the performance measurement section 116 performs a performance measurement on the generated patterns in a verification environment ("first performance measurement").

In step S109, the execution file generation section 117 creates combination patterns using patterns that have succeeded to accelerate in the first measurement.

In step S110, the execution file generation section 117 compiles the generated combination patterns.

In step S111, the performance measurement section 116 performs a performance measurement on the generated combination patterns in a verification environment ("second performance measurement").

In step S112, the actual environment deployment section 118 selects a pattern with the highest performance in the first and second measurements, and the processing of the flow ends.

Flowchart of <Processing A-2>, <Processing B-2>, and <Processing C-2>

Figure 5:
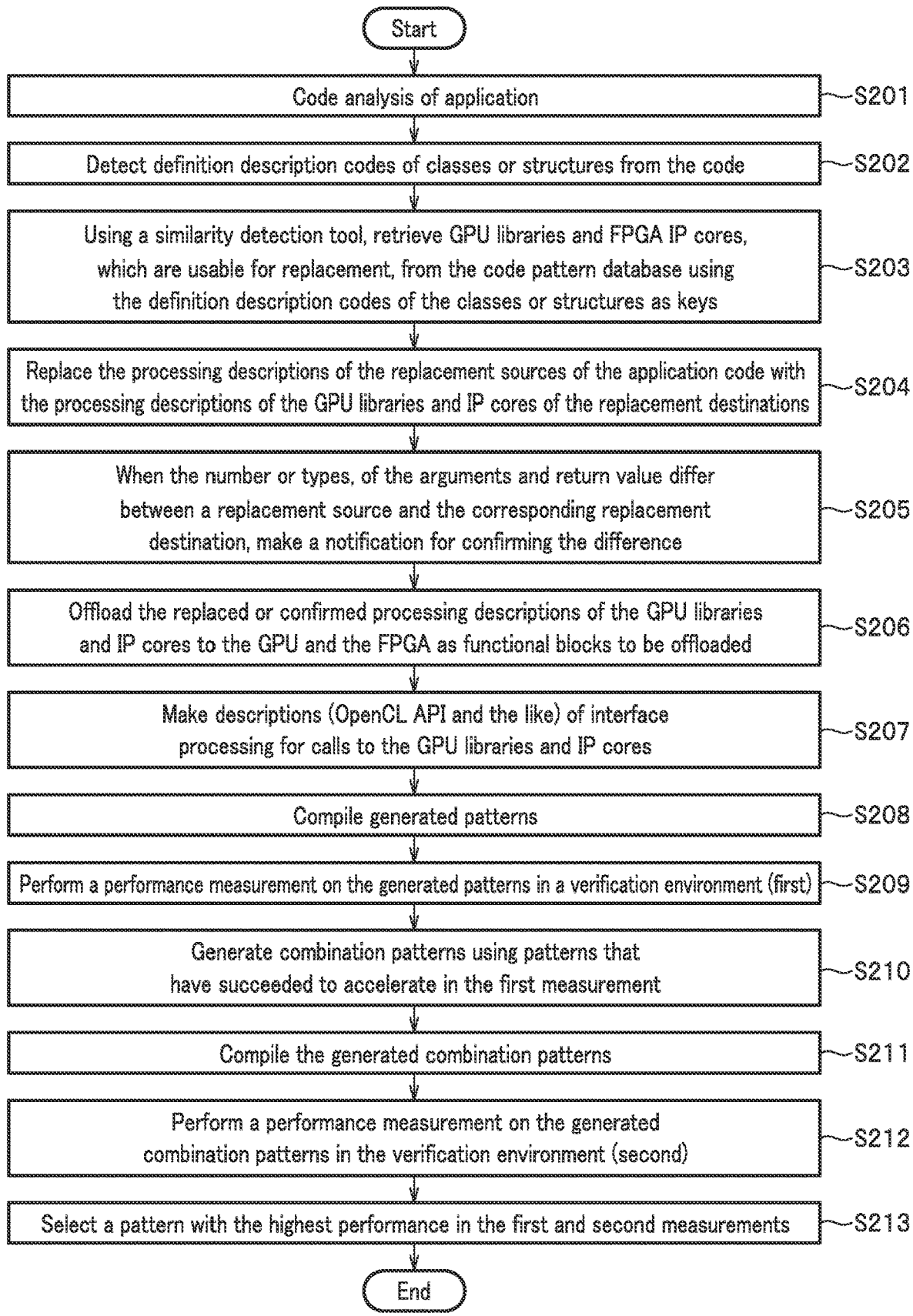
FIG. 5 is a flowchart of a case in which the control section of the offload server according to the above-described embodiment executes <Processing A-2>, <Processing B-2>, and <Processing C-2> in the offload processing of the functional blocks.

FIG. 5 is a flowchart of a case in which the control section (automatic offloading function section) 11 of the offload server 1 performs <Processing A-2>, <Processing B-2>, and <Processing C-2> in the processing of offloading functional blocks. Note that processing from <Processing A-2> may be performed in parallel with processing from <Processing A-1>.

In step S201, the application code analysis section 112 (see FIG. 2) analyzes application source code desired to be offloaded. Specifically, the application code analysis section 112, using a syntax analysis tool such as Clang, performs analysis of the source code to analyze, in addition to loop statement structures or the like, library calls and functional processing included in the code.

In step S202, the replacement function detection section 113 (see FIG. 2) detects definition description codes of classes or structures from the source code.

In step S203, the replacement function detection section 113, using a similarity detection tool, retrieves GPU libraries and/or IP cores, which are usable for replacement, from the code pattern database 130 using the definition description codes of the classes or structures as keys.

In step S204, the replacement processing section 114 replaces the processing descriptions of the replacement sources of the application code with the processing descriptions of the GPU libraries and/or IP cores of the replacement destinations.

In step S205, when the number and/or types, of the arguments and return value differ between a replacement source and the corresponding replacement destination, the replacement processing section 114 confirms with the user.

In step S206, the replacement function detection section 113 offloads the replaced or confirmed processing descriptions of the replacement sources of the application code to the GPU or the FPGA as functional blocks to be offloaded.

In step S207, the replacement processing section 114 makes descriptions (OpenCL API and the like) of the interface processing for calls to the GPU libraries and IP cores.

In step S208, the execution file generation section 117 compiles generated patterns.

In step S209, the performance measurement section 116 performs a performance measurement on the generated patterns in a verification environment ("first performance measurement").

In step S210, the execution file generation section 117 generates combination patterns using patterns that has succeeded to accelerate in the first measurement.

At step S211, the execution file generation section 117 compiles the generated combination patterns.

In step S212, the performance measurement section 116 performs a performance measurement on the generated combination patterns in a verification environment ("second performance measurement").

In step S213, the actual environment deployment section 118 selects a pattern with the highest performance in the first and second measurements, and the processing of the flow ends.

Implementation Example

A description will be given of an implementation.

<Example of Tools for Use in Implementation>

As the GPU, NVIDIA Quadro P4000 (CUDA core: 1792, Memory: GDDR5 8 GB) can be used. An FPGA such as Intel PAC with Intel Arria 10 GX FPGA can be used.

For GPU processing, PGI compiler in the market can be used. PGI compiler is a compiler that interprets OpenACC for C/C++/Fortran. By designating loop statements such as for statements with OpenACC directives #pragma acc kernels and #pragma acc parallel loop, PGI compiler generates bytecode for GPU, and execution of that bytecode achieves GPU offloading. At the same time, PGI compiler can also process calls to CUDA libraries such as cuFFT and cuBLAS.

For FPGA processing, Intel Acceleration Stack (Intel FPGA SDK for OpenCL, Quartus Prime Version) and the like can be used. Intel FPGA SDK for OpenCL is a high-level synthesis tool (HLS) that interprets #pragma and the like for Intel in addition to standard OpenCL. The high-level synthesis tool interprets an OpenCL code describing a kernel to be processed on an FPGA and a host program to be processed on a CPU, outputs information such as the amount of resources, and performs wiring operation and the like for the FPGA so that the program can run on the FPGA. It takes a long time, such as about three hours, to cause even a small program of about 100 lines to operate on the actual machine equipped with an FPGA. However, when the amount of the resource available is exceeded, an error occurs in an early stage. If an existing OpenCL code of FPGA is incorporated into the kernel code, offloading is possible in the OpenCL program processing.

As the code pattern database 130, MySQL or the like can be used. The code pattern database 130 retains records for searching for a GPU library or an FPGA IP core, which can perform acceleration, using as the key the name of the library being called. The libraries and the IP cores are each associated with a name, a code, and an execution file, which are retained. The usage method or the like of the execution file is also registered. At the same time, the code pattern database 130 also retains correspondence relationships with codes for comparison for detecting a library or IP core by a similarity detection technique.

Deckard or the like can be used as the similarity detection tool. Deckard makes it possible to offload, in addition to calls to libraries, functions whose code is copied and modified, to extend the range of application of offloading functional blocks. In this regard, Deckard determines the similarity between the partial code to be compared and the codes registered in the code pattern database 130.

An overview of operation of an implementation will be described.

<Overview of Operation of Implementation>

In an implementation example, upon receipt of a request for utilization of a C/C++ application, the code of the C/C++ application is first analyzed to detect loop statements in order to use the loop statements for offloading. The program structure is identified, wherein <Processing A-1> identifies libraries to be called and <Processing A-2> identifies defined classes and structures. A syntax analysis library such as LLVM/Clang is used to parse syntax. Whether there is an external library to be called is confirmed by checking with the external library list in the code pattern database 130.

In the implementation example, next, <Processing B-1> detects GPU libraries and/or FPGA IP cores that can increase the speed of the libraries to be called. Using the libraries to be called as keys, execution files, OpenCL, and the like that can increase the speed are retrieved from the records registered in the code pattern database 130. If replacement functions that can increase the speed is found, an execution file for <Processing C-1> is generated. In the case of GPU a library, the original portion of the C/C++ code is deleted and replaced with a description to call the CUDA library for replacement. In the case of an FPGA IP core, the original portion is deleted, and then the retrieved OpenCL code is described in a kernel code for replacement. When each replacement description is completed, compilation for GPU is performed with PGI compiler and compilation for FPGA is performed with Intel acceleration stack. Regarding the FPGA, a connection between the CPU and the FPGA is established according to the OpenCL code via a high-level synthesis tool (HLS).

The case of library calls has been described above.

A description will be given of a case in which the replacement function detection section 113 (see FIG. 2) performs similarity detection using a similarity detection tool. In a case where similarity detection is performed, processing is performed in parallel with the above-described replacement description. In other words, in the case where the replacement function detection section 113 performs similarity detection, in the implementation example, <Processing B-2> performs, using Deckard, similarity detection between the detected partial code of the classes, structures, and the like and the comparative codes registered in the code pattern database 130. Then, the replacement function detection section 113 detects functional blocks having exceeded a threshold and the corresponding GPU libraries and/or FPGA IP cores. The replacement function detection section 113 retrieves the execution files and OpenCL in the same manner as in the case of <Processing B-1>. The implementation example then generates an execution file in the same manner as in C-1. However, in particular in a case where there is a difference between the code of the replacement source and the replacement library or IP core, in terms of the interface, such as the arguments, return value, type, and the like, the implementation example inquires the user having requested offloading as to whether the interface may be modified according to the replacement destination library or IP core, and, after receipt of confirmation, generates an execution file.

At this time point, an execution file for which a performance measurement can be performed with the GPU and/or FPGA in the verification environment is created. Regarding the functional block offloading, in a case where there is one functional block to be replaced, selectable options are only whether the one functional block is to be offloaded or not. In a case where there are a plurality of functional blocks, a verification pattern is created for each to check whether offloading is to be performed, and the performance is measured to detect a high speed solution. This is because, even if acceleration is considered possible, it is not possible to know whether the speed will be increased under the actual condition unless the measurement is actually performed. For example, in a case where there are five offloadable functional blocks and offloading of No. 2 and No. 4 can increase the speed as a result of the first measurement, the second measurement is performed with a pattern of offloading both No. 2 and No. 4. In a case where it is faster than the cases of offloading No. 2 and No. 4 alone, it is selected as the solution.

[Hardware Configuration]

Figure 6:
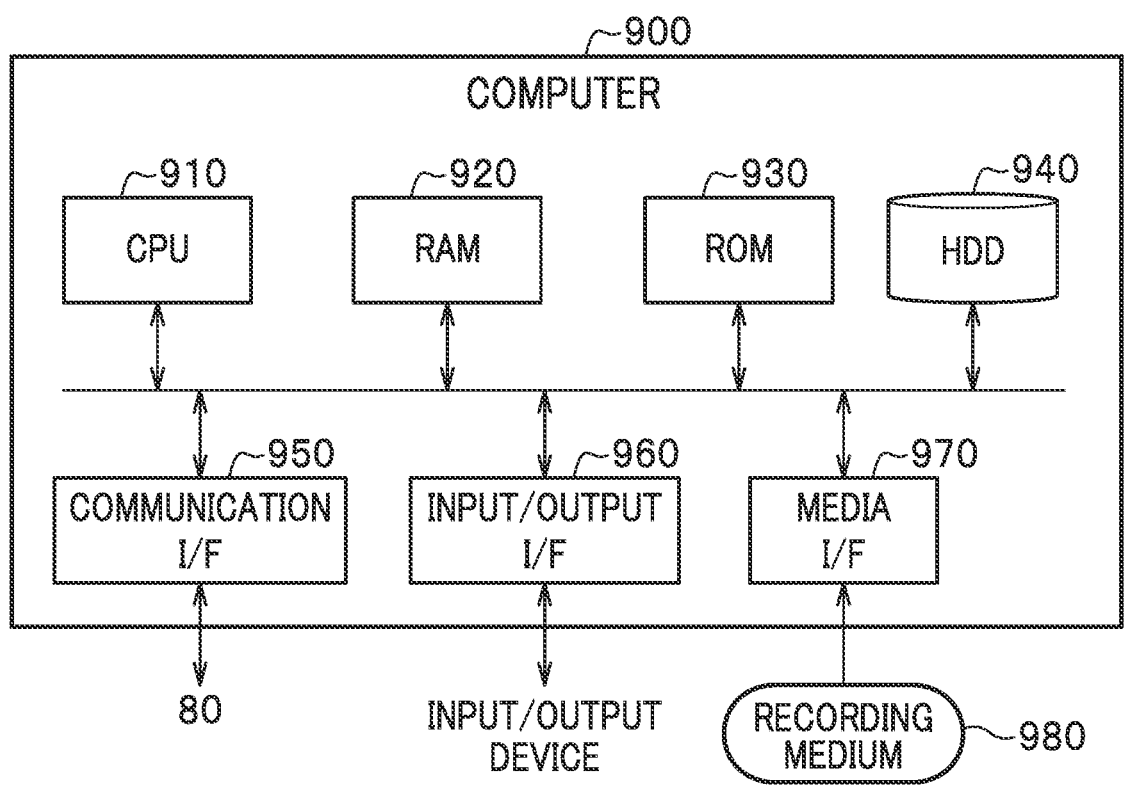
FIG. 6 is a hardware configuration diagram illustrating an example of a computer that implements the functions of the offload server according to an embodiment of the present invention.

The offload server 1 according to the present embodiment is embodied by, for example, a computer 900 having a configuration as illustrated in FIG. 6.

FIG. 6 is a hardware configuration diagram illustrating an example of computer 900 that embodies the functions of offload server 1.

Computer 900 includes a CPU 910, a RAM 920, a ROM 930, an HDD 940, a communication interface (I/F: Interface) 950, an input/output interface (I/F) 960, and a media interface (I/F) 970.

CPU 910 operates and performs control of each section according to a program stored in ROM 930 or HDD 940. ROM 930 stores a boot program to be executed by CPU 910 when computer 900 starts up, a program that relies on the hardware of computer 900, and the like.

HDD 940 stores programs to be executed by CPU 910, data to be used by the programs, and the like. Communication interface 950 receives data from another device via a communication network 80, sends the received data to CPU 910, and transmits data generated by CPU 910 to another device via communication network 80.

CPU 910 controls an output device such as a display or a printer and an input device such as a keyboard or a mouse via input/output interface 960. CPU 910 receives data from the input device via input/output interface 960. Also, CPU 910 outputs generated data to the output device via input/output interface 960.

Media interface 970 reads a program or data stored in a recording medium 980 and provides the read program or data to CPU 910 via RAM 920. CPU 910 loads the program from recording medium 980 onto RAM 920 via media interface 970 and executes the loaded program. Recording medium 980 is, for example, a computer-readable medium or an optical recording medium such as a DVD (Digital Versatile Disc) or PD (Phase change rewritable Disk), a magneto-optical recording medium such as an MO (Magneto Optical disk), a tape medium, a magnetic recording medium, a semiconductor memory, or the like.

For example, if computer 900 functions as an offload server 1 according to the present embodiment, CPU 910 of computer 900 embodies the function of each section of offload server 1 by executing the program loaded on RAM 920. Also, HDD 940 stores the data in each section of offload server 1. CPU 910 of computer 900 reads these programs from recording medium 980 and executes them, but in another example, these programs may be received from another device via communication network 80.

[Effects]

As described above, the offload server 1 according to the present embodiment is an offload server for offloading a specific processing of an application to a GPU or a PLD, the offload server including: a code pattern database 130 configured to store libraries and IP cores that can be offloaded to the GPU or the PLD; an application code analysis section 112 configured to analyze a source code of the application and detect external library calls included in the source code; the replacement function detection section 113 configured to retrieve the libraries and IP cores from the code pattern database 130 by using the detected external library calls as keys; the replacement processing section 114 configured to replace processing descriptions of replacement sources of the source code of the application with processing descriptions of replacement destinations of the libraries and IP cores retrieved by the replacement function detection section 113 and to offload the processing descriptions of the libraries and IP cores used for replacement to the GPU or the PLD as functional blocks to be offloaded; the offload pattern generation section 115 configured to generate interfaces with a host program and perform trials of offloading and trials of not offloading through performance measurements in a verification environment, to extract an offload pattern that leads to higher speed; the execution file generation section 117 configured to compile the application of a generated GPU/PLD processing pattern to generate an execution file; and the performance measurement section 116 configured to deploy the generated execution file to an accelerator verification device and perform processing for a measurement of a performance obtained when offloading the execution file to the GPU or the PLD. The execution file generation section 117 selects a GPU/PLD processing pattern with a highest processing performance from a plurality of the GPU/PLD processing patterns on the basis of a result of the performance measurement by the processing for the measurement of the performance, and compile the GPU/PLD processing pattern with the highest processing performance to create a final execution file.

In this way, the processing descriptions of the replacement sources of the application code are replaced with the processing descriptions of the libraries and IP cores of the replacement destinations, and are offloaded to the GPU and/or PLD (FPGA or the like) as offloadable functional blocks. In other words, functional block which are implemented including algorithms for hardware such as an FPGA and/or a GPU are offloaded in a larger unit such as matrix integration and Fourier transformation rather than units of individual loop statements. With this, it is possible to increase the speed of offload processing by performing offloading in units of functional blocks in the automatic offloading to the GPU or the PLD (FPGA or the like). As a result, in the increasingly diversified environment of GPUs, FPGAs, and IoT devices, applications can be adapted according to the environment can be operated with high performance.

According to the present embodiment, the code pattern database 130 stores classes or structures whose descriptions would each be described in a similar fashion in cases computation of the classes or the structures is to be performed on a host; the application code analysis section 112 detects definition description codes of classes or structures from the source code; the replacement function detection section 113 retrieves libraries and IP cores from the code pattern database 130 by using the detected definition description codes of the classes or structures as keys; and the replacement processing section 114 replaces the processing descriptions of the replacement sources of the source code of the application with the processing descriptions of the retrieved libraries and IP cores and makes a notification for confirmation when there is a difference between the replacement sources and the replacement destinations in terms of the number or types of the arguments and return value.

In this way, GPU libraries and IP cores are detected by using the definition description codes of the classes or structures as keys, and the processing descriptions of the replacement sources of the application code are replaced with the processing descriptions of the GPU libraries and IP cores of the replacement destinations. Moreover, when the number or types of the arguments and return value differ between a replacement sources and the corresponding replacement destination, the user is inquired for confirmation, for example. With this feature, it is possible to detect not-registered functional processing other than library calls.

According to the present embodiment, the replacement function detection section 113 retrieves from the code pattern database 130 a library and an IP core using a similarity detection tool that detects copied codes and/or codes which have been modified after being copied.

In this way, the similarity between partial code to be compared and the definition description codes registered in the storage section are determined using the similarity detection tool, thereby the range of application of offloading functional blocks is extended.

According to the present embodiment, the code pattern database 130 stores a CUDA library and a library usage procedure for using the CUDA library as the libraries, and the replacement function detection section 113 retrieves the CUDA library from the code pattern database 130 according to the library usage procedure.

In this way, storing the CUDA library and the usage procedure as well makes it possible to detect CUDA library from the source code. With this feature, the processing descriptions of the replacement sources of the application code are replaced with the CUDA library processing descriptions of the replacement destinations and offloaded to the GPU as functional blocks.

According to the present embodiment, the code pattern database 130 stores OpenCL codes as IP core related information, and the offload pattern generation section 115 connects the host and the PLD using an OpenCL interface based on the OpenCL code, and performs implementation of the IP core to the PLD based on the OpenCL code.

In this way, the host and the PLD is connected using the OpenCL code as a kernel code, and the implementation of the IP core to the PLD is performed. For example, in the case of an FPGA IP, the original portion is deleted and then the retrieved OpenCL code is described in a kernel code for replacement. Regarding cases of FPGA, the CPU and the FPGA are connected on the basis of the OpenCL code via a high-level synthesis tool.

The present invention provides an offload program for causing a computer to function as the offload server described above.

Thus, the functions of the offload server 1 described above can be implemented using a commonly used computer.

Among the processing described in the embodiment, all or some of the processing described as being performed automatically may be performed manually, or all or some of the processing described as being performed manually may be performed automatically using a known method. In addition, information including process procedures, control procedures, specific names, various types of data and parameters described and illustrated in the description and drawings may be changed as appropriate unless otherwise stated.

Further, the components of the devices illustrated in the drawings are functionally conceptual and do not necessarily need to be physically configured as illustrated. In other words, specific form of distribution and integration of the devices are not limited to those illustrated in the drawings and all or some of the devices can be distributed or integrated functionally or physically in any units according to various loads and usages.

Further, some or all of the configurations, functions, processing units, processing means and the like described above may be implemented in hardware by, for example, designing them in integrated circuits. Further, the configurations, functions and the like described above may be implemented in software that causes a processor to interpret and execute a program that implements the functions. The program that implements the functions and information such as tables and files can be held in a recording device such as a memory, a hard disk, or an SSD (Solid State Drive) or a recording medium such as an IC (Integrated Circuit) card, an SD (Secure Digital) card, or an optical disc.

Further, the present embodiment is applicable as long as GPU processing or FPGA processing can be offloaded.

REFERENCE SIGNS LIST

1 Offload server
11 Control section
12 Input/Output section
13 Storage section
14 Verification machine (accelerator verification device)
15 Commercial environment
111 Application code designation section
112 Application code analysis section
113 Replacement function detection section
114 Replacement processing section
115 Offload pattern generation section
116 Performance measurement section
116a Binary file deployment section
117 Execution file generation section
118 Actual environment deployment section
119 Performance measurement test extraction and execution section
120 Provision-to-user section
130 Code pattern database
131 Test case database
151 Various types of devices
152 CPU-GPU-equipped device
153 CPU-FPGA-equipped device
154 CPU-equipped device

The invention claimed is:

1. An offload server for offloading specific processing of an application to a Graphics Processing Unit (GPU) or a Programmable Logic Device (PLD), the offload server comprising:
one or more hardware processors;
a storage section, implemented using one or more of the one or more hardware processors, configured to store, in a code pattern database, libraries usable for offloading the specific processing to the GPU and Intellectual Property (IP) cores usable for offloading the specific processing to the PLD;
an application code analysis section, implemented using one or more of the one or more hardware processors, configured to analyze a source code of the application to detect external library calls included in the source code;
a replacement function detection section, implemented using one or more of the one or more hardware processors, configured to, using the detected external library calls as keys, search the code pattern database to retrieve, of the libraries and IP cores, those corresponding to the detected external library calls as replacement-destination libraries/IP cores, thereby to extract offloadable processing that can be offloaded by the retrieved replacement-destination libraries/IP cores as offloadable replacement sources;
a replacement processing section, implemented using one or more of the one or more hardware processors, configured to replace processing descriptions of the offloadable replacement sources with processing descriptions of the replacement-destination libraries/IP cores and to generate interfaces that interface a central processing unit (CPU) to the replacement-destination libraries/IP cores;
an offload pattern generation section, implemented using one or more of the one or more hardware processors, configured to generate one or more offload patterns, each of which designates, for each of the offloadable replacement sources, whether to offload the processing to be performed by the offloadable replacement source;
an execution file generation section, implemented using one or more of the one or more hardware processors, configured to, for each of the one or more offload patterns, compile the application according to the offload pattern to generate an execution file; and
a performance measurement section, implemented using one or more of the one or more hardware processors, configured to, for each generated execution file, deploy the generated execution file to an accelerator verification device and perform processing for a measurement of a performance obtained when offloading to the GPU and/or the PLD is performed,
wherein the execution file generation section is configured to select an offload pattern with a highest processing performance from the one or more offload patterns on the basis of a result of the performance measurement by the processing for the measurement of the performance, and compile the application according to the offload pattern with the highest processing performance to generate a final execution file.

2. The offload server according to claim 1,
wherein the offloadable replacement sources are first offloadable replacement sources and the replacement-destination libraries/IP cores corresponding to the offloadable replacement sources are first replacement-destination libraries/IP cores,
wherein the storage section is further configured to store, in the code pattern database, classes and structures whose descriptions would each be described in a similar fashion in cases processing of the classes and the structures is to be performed on a host on which the application is to be executed,
wherein the application code analysis section is further configured to detect definition description codes of classes and/or structures from the source code,
wherein the replacement function detection section is further configured to, using the detected definition description codes as keys, search the code pattern database to retrieve second replacement-destination libraries/IP cores which are usable for replacement, thereby to extract offloadable processing that can be offloaded by the retrieved second replacement-destination libraries/IP cores as second offloadable replacement sources;
wherein the replacement processing section is further configured to replace processing descriptions of the second offloadable replacement sources with processing descriptions of the second replacement-destination libraries/IP cores and make a notification for confirmation when there is a difference between the second offloadable replacement sources and the second replacement-destination libraries/IP cores in terms of a number and/or types of arguments and a return value.

3. The offload server according to claim 2,
wherein the replacement function detection section is configured to, using a similarity detection tool that detects copied codes and/or codes which have been modified after being copied, search the code pattern database to retrieve the second replacement-destination libraries/IP cores.

4. The offload server according to claim 1, wherein the libraries stored in the code pattern database comprises a compute unified device architecture (CUDA) library and a library usage procedure for using the CUDA library, and wherein the replacement function detection section is configured to retrieve the CUDA library according to the library usage procedure when the CUDA library is included in the replacement-destination libraries/IP cores.

5. The offload server according to claim 1, wherein the storage section is configured to store open computing language (OpenCL) codes as IP core related information in the code pattern database, and wherein the offload pattern generation section is configured to connect a host on which the application is to be executed and the PLD using OpenCL interfaces based on the OpenCL codes, and perform implementation of the IP cores to the PLD according to the OpenCL codes.

6. An offload control method for an offload server that offloads specific processing of an application to a Graphics Processing Unit (GPU) or a Programmable Logic Device (PLD), the offload server comprising:
one or more hardware processors; and
a storage section, implemented using one or more of the one or more hardware processors, configured to store, in a code pattern database, libraries usable for offloading the specific processing to the GPU and Intellectual Property (IP) cores usable for offloading the specific processing to the PLD,
the offload control method being to be performed by the offload server and comprising steps of:
analyzing a source code of the application and detecting external library calls included in the source code;
using the detected external library calls as keys, searching the code pattern database to retrieve, of the libraries and IP cores, those corresponding to the detected external library calls as replacement-destination libraries/IP cores, thereby to extract offloadable processing that can be offloaded by the retrieved replacement-destination libraries/IP cores as offloadable replacement sources;
replacing processing descriptions of the offloadable replacement sources with processing descriptions of the replacement-destination libraries/IP cores;
generating interfaces that interface a central processing unit (CPU) to the replacement-destination libraries/IP cores;
generating one or more offload patterns, each of which designates, for each of the offloadable replacement sources, whether to offload the processing to be performed by the offloadable replacement source;
for each of the one or more offload patterns, compiling the application according to the offload pattern to generate an execution file; and
for each generated execution file, deploying the generated execution file to an accelerator verification device and performing processing for a measurement of a performance obtained when offloading to the GPU and/or the PLD is performed;
selecting an offload pattern with a highest processing performance from the one or more offload patterns on the basis of a result of the performance measurement by the processing for the measurement of the performance; and
compiling the application according to the offload pattern with the highest processing performance to generate a final execution file.

7. A non-transitory computer-readable medium storing a computer program configured to cause an offload server to offload specific processing of an application to a Graphics Processing Unit (GPU) or a Programmable Logic Device (PLD), the offload server comprising: one or more hardware processors; a storage section, implemented using one or more of the one or more hardware processors, configured to store, in a code pattern database, libraries usable for offloading the specific processing to the GPU and Intellectual Property UP) cores usable for offloading the specific processing to the PLD; an application code analysis section, implemented using one or more of the one or more hardware processors, configured to analyze a source code of the application to detect external library calls included in the source code; a replacement function detection section, implemented using one or more of the one or more hardware processors, configured to, using the detected external library calls as keys, search the code pattern database to retrieve, of the libraries and IP cores, those corresponding to the detected external library calls as replacement-destination libraries/IP cores, thereby to identify the external library calls corresponding to the retrieved replacement-destination libraries/IP cores as offloadable replacement sources; a replacement processing section, implemented using one or more of the one or more hardware processors, configured to replace processing descriptions of the offloadable replacement sources with processing descriptions of the replacement-destination libraries/IP cores and to generate interfaces that interface a central processing unit (CPU) to the replacement-destination libraries/IP cores;

an offload pattern generation section, implemented using one or more of the one or more hardware processors, configured to generate one or more offload patterns, each of which designates, for each of the offloadable replacement sources, whether to offload the processing to be performed by the offloadable replacement source;

an execution file generation section, implemented using one or more of the one or more hardware processors, configured to, for each of the one or more offload patterns, compile the application according to the offload pattern to generate an execution file; and a performance measurement section, implemented using one or more of the one or more hardware processors, configured to, for each generated execution file, deploy the generated execution file to an accelerator verification device and perform processing for a measurement of a performance obtained when offloading to the GPU and/or the PLD is performed, wherein the execution file generation section is configured to select an offload pattern with a highest processing performance from the one or more offload patterns on the basis of a result of the performance measurement by the processing for the measurement of the performance, and compile the application according to the offload pattern with the highest processing performance to generate a final execution file.

\* \* \* \* \*